(12) United States Patent
Miller, III et al.

(10) Patent No.: US 11,183,222 B2
(45) Date of Patent: *Nov. 23, 2021

(54) RECIRCULATION FILTER FOR AN ENCLOSURE

(71) Applicant: Donaldson Company, Inc., Minneapolis, MN (US)

(72) Inventors: Stanley B. Miller, III, Eden Prairie, MN (US); Allen N. Nicklay, Eden Prairie, MN (US); Christopher J. Fischer, Minneapolis, MN (US); Daniel L. Tuma, St. Paul, MN (US)

(73) Assignee: Donaldson Company, Inc., Minneapolis, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/667,148

(22) Filed: Oct. 29, 2019

(65) Prior Publication Data

US 2020/0066307 A1  Feb. 27, 2020

Related U.S. Application Data

(63) Continuation of application No. 15/118,410, filed as application No. PCT/US2015/015591 on Feb. 12, 2015, now Pat. No. 10,482,928.

(Continued)

(51) Int. Cl.
*B01D 53/02* (2006.01)
*G11B 33/14* (2006.01)
(Continued)

(52) U.S. Cl.
CPC .......... *G11B 33/146* (2013.01); *B01D 24/008* (2013.01); *B01D 39/1607* (2013.01);
(Continued)

(58) Field of Classification Search
CPC ............ B01D 2279/45; B01D 46/0002; B01D 46/0032; B01D 46/2403; B01D 53/0407; B03C 3/28; B03C 3/30; G11B 33/146
See application file for complete search history.

(56) References Cited

U.S. PATENT DOCUMENTS 4,418,369 A  11/1983  Applequist et al.
4,488,193 A  12/1984  Davis et al.
(Continued)

FOREIGN PATENT DOCUMENTS

CN  101421014 A  4/2009
CN  101460252     6/2009
(Continued)

OTHER PUBLICATIONS

"Adsorbent Breather Assembly (ABA) Product Guidelines & Specifications," Donaldson Company 2003, 1 page.
(Continued)

*Primary Examiner* — Christopher P Jones
(74) *Attorney, Agent, or Firm* — Mueting Raasch Group

(57) ABSTRACT

The technology disclosed herein relates to filter assemblies and methods of making filter assemblies. One filter assembly has a first sheet of filter media having a first perimeter region and a second sheet of filter media having a second perimeter region. The first perimeter region and the second perimeter region are bonded in a rim region. A plurality of adsorbent beads are disposed between the first sheet of filter media and the second sheet of filter media, and a substantial portion of the plurality of adsorbent beads are unbonded. Other embodiments are also described.

19 Claims, 8 Drawing Sheets

Related U.S. Application Data

(60) Provisional application No. 61/939,683, filed on Feb. 13, 2014.

(51) Int. Cl.
  *B01D 24/00* (2006.01)
  *B01D 39/16* (2006.01)
  *B01J 20/20* (2006.01)
  *B01D 39/00* (2006.01)

(52) U.S. Cl.
  CPC ............... *B01J 20/20* (2013.01); *B01D 39/00* (2013.01); *B01D 2253/00* (2013.01); *B01D 2279/45* (2013.01); *G11B 33/14* (2013.01)

(56) References Cited

U.S. PATENT DOCUMENTS

| | | | |
|---|---|---|---|
| 4,581,668 A | 4/1986 | Campbell | |
| 4,594,626 A | 6/1986 | Frangesh | |
| 4,725,904 A | 2/1988 | Dalziel | |
| 4,809,102 A | 2/1989 | Hatchett et al. | |
| 4,830,643 A | 5/1989 | Sassa et al. | |
| 4,857,087 A | 8/1989 | Bolton et al. | |
| 5,025,337 A | 6/1991 | Brooks | |
| 5,030,260 A | 7/1991 | Beck et al. | |
| 5,269,824 A | 12/1993 | Takita et al. | |
| 5,302,354 A | 4/1994 | Watvedt et al. | |
| 5,406,431 A | 4/1995 | Beecroft | |
| 5,417,743 A | 5/1995 | Dauber | |
| 5,538,545 A | 7/1996 | Dauber et al. | |
| 5,539,595 A | 7/1996 | Beck et al. | |
| 5,593,482 A | 1/1997 | Dauber et al. | |
| 5,594,600 A | 1/1997 | Bruner et al. | |
| 5,615,070 A | 3/1997 | Bordes | |
| 5,696,649 A | 12/1997 | Boutaghou | |
| 5,739,980 A | 4/1998 | Brooks | |
| 5,754,365 A | 5/1998 | Beck et al. | |
| 5,772,883 A * | 6/1998 | Rothman | B01D 46/103 210/487 |
| 5,869,009 A | 2/1999 | Bellefeuille et al. | |
| 5,872,678 A | 2/1999 | Boigenzahn et al. | |
| 5,872,679 A | 2/1999 | Boigenzahn et al. | |
| 5,876,487 A | 3/1999 | Dahlgren et al. | |
| 5,977,618 A | 11/1999 | Mathiew et al. | |
| 5,997,618 A | 12/1999 | Schneider et al. | |
| 6,077,335 A | 6/2000 | Schneider et al. | |
| 6,143,058 A | 11/2000 | Dalhgren et al. | |
| 6,200,368 B1 * | 3/2001 | Guerin | B01D 46/0001 55/385.3 |
| 6,208,484 B1 | 3/2001 | Voights | |
| 6,217,637 B1 | 4/2001 | Toney et al. | |
| 6,238,467 B1 | 5/2001 | Azarian et al. | |
| 6,285,524 B1 | 9/2001 | Boigenzahn et al. | |
| 6,296,691 B1 | 10/2001 | Gidumal | |
| 6,395,073 B1 | 5/2002 | Dauber | |
| 6,475,269 B1 | 11/2002 | Turner | |
| 6,475,270 B1 | 11/2002 | Graeve | |
| 6,557,240 B1 | 5/2003 | Voights | |
| 6,831,830 B2 | 12/2004 | Bruner et al. | |
| 6,876,514 B1 | 4/2005 | Little | |
| 6,926,761 B2 | 8/2005 | Johnson et al. | |
| 6,936,093 B2 | 8/2005 | Isogawa et al. | |
| 7,012,782 B2 | 3/2006 | Albrecht et al. | |
| 7,019,941 B2 | 3/2006 | Yoo | |
| 7,095,584 B2 | 8/2006 | Logan | |
| 7,113,402 B2 | 9/2006 | Rutledge et al. | |
| 7,166,142 B2 | 1/2007 | Tuma et al. | |
| 7,291,208 B2 | 11/2007 | Dauber et al. | |
| 7,295,398 B2 | 11/2007 | McMaster et al. | |
| 7,306,659 B2 | 12/2007 | Gorton et al. | |
| 7,312,950 B2 | 12/2007 | Voights et al. | |
| 7,318,859 B2 | 1/2008 | Ball et al. | |
| 7,382,572 B1 | 6/2008 | Turner et al. | |
| 7,388,731 B1 | 6/2008 | Little et al. | |
| 7,404,836 B2 | 7/2008 | Garikipati et al. | |
| 7,463,454 B2 | 12/2008 | Mastromatteo et al. | |
| 7,525,802 B2 | 4/2009 | Yu et al. | |
| 7,569,089 B2 | 8/2009 | Avina | |
| 7,573,672 B2 | 8/2009 | Han et al. | |
| 7,591,868 B2 | 9/2009 | Johnson | |
| 7,601,192 B2 | 10/2009 | Boulay et al. | |
| 7,652,843 B2 | 1/2010 | Albrecht et al. | |
| 7,667,924 B2 | 2/2010 | Han et al. | |
| 7,686,871 B2 | 3/2010 | Oh et al. | |
| 7,727,297 B2 | 6/2010 | Dauber et al. | |
| 8,016,917 B2 | 9/2011 | Avina | |
| 8,033,304 B2 | 10/2011 | Tuma | |
| 8,102,619 B2 | 1/2012 | Chan et al. | |
| 8,111,486 B2 | 2/2012 | Suh et al. | |
| 8,116,029 B2 | 2/2012 | Miller, III | |
| 8,263,214 B2 | 9/2012 | Kalayci et al. | |
| 8,303,806 B2 | 11/2012 | Mohseni et al. | |
| 8,585,793 B2 | 11/2013 | Bishop et al. | |
| 8,638,524 B2 | 1/2014 | Brown | |
| 8,864,884 B2 | 10/2014 | Tuma | |
| 8,885,291 B2 | 11/2014 | Miller et al. | |
| 9,153,291 B2 | 10/2015 | Miller et al. | |
| 2003/0218828 A1 | 11/2003 | Hong et al. | |
| 2004/0159603 A1 | 8/2004 | Boulnois et al. | |
| 2004/0168575 A1 | 9/2004 | Isogawa et al. | |
| 2004/0231518 A1 | 11/2004 | Johnson et al. | |
| 2004/0255783 A1 | 12/2004 | Graham et al. | |
| 2004/0255785 A1 * | 12/2004 | Koslow | B01D 39/202 96/154 |
| 2005/0047001 A1 | 3/2005 | Logan | |
| 2005/0139078 A1 | 6/2005 | Tuma et al. | |
| 2005/0185327 A1 | 8/2005 | Voights et al. | |
| 2006/0081128 A1 * | 4/2006 | Ball | B01J 20/28033 96/121 |
| 2006/0191249 A1 | 8/2006 | Gogins et al. | |
| 2006/0272507 A1 | 12/2006 | Johnson | |
| 2007/0103811 A1 | 5/2007 | Olszewski | |
| 2007/0157588 A1 * | 7/2007 | Dauber | B01D 46/103 55/385.6 |
| 2007/0261557 A1 * | 11/2007 | Gadkaree | B01D 53/02 96/121 |
| 2007/0283809 A1 | 12/2007 | Boulay et al. | |
| 2008/0226534 A1 | 9/2008 | Gidumal et al. | |
| 2008/0262213 A1 | 10/2008 | Wu et al. | |
| 2008/0314005 A1 * | 12/2008 | Sauer | B01D 46/0043 55/368 |
| 2009/0090245 A1 | 4/2009 | Olszewski | |
| 2009/0183475 A1 | 7/2009 | Dauber et al. | |
| 2012/0060693 A1 * | 3/2012 | Sasaki | B01D 63/00 96/139 |
| 2012/0118158 A1 | 5/2012 | Tuma et al. | |
| 2012/0172216 A1 | 7/2012 | Böhringer et al. | |
| 2013/0088795 A1 | 4/2013 | Brown | |
| 2014/0043711 A1 | 2/2014 | Miller et al. | |
| 2015/0033824 A1 | 2/2015 | Hammarlund et al. | |
| 2015/0082985 A1 | 3/2015 | Miller et al. | |
| 2015/0196924 A1 | 7/2015 | Miller et al. | |
| 2016/0251106 A1 * | 9/2016 | Kuziw | B65D 90/041 220/571 |
| 2017/0333820 A1 | 11/2017 | Tuma | |

FOREIGN PATENT DOCUMENTS

| | | |
|---|---|---|
| CN | 101668587 A | 3/2010 |
| CN | 101952008 | 1/2011 |
| CN | 104769676 | 7/2015 |
| EP | 0123130 | 10/1984 |
| EP | 0263932 | 4/1988 |
| EP | 0391555 | 10/1990 |
| EP | 0692788 | 1/1996 |
| EP | 0744747 | 11/1996 |
| EP | 1218090 | 7/2002 |
| EP | 1222661 | 7/2002 |
| GB | 2024495 | 1/1980 |
| GB | 2202076 | 9/1988 |
| GB | 2275811 | 9/1994 |
| JP | 2006341193 A | 12/2006 |

(56) References Cited

FOREIGN PATENT DOCUMENTS

| JP | 2015531141 | 10/2008 |
|---|---|---|
| KR | 1020080083884 | 9/2008 |
| WO | WO 91/14496 | 10/1991 |
| WO | WO 95/19831 | 7/1995 |
| WO | WO 96/14136 | 5/1996 |
| WO | WO 98/41989 | 9/1998 |
| WO | WO 99/04884 | 2/1999 |
| WO | WO 01/22421 | 3/2001 |
| WO | WO 01/22422 | 3/2001 |
| WO | WO 01/14041 | 9/2001 |
| WO | WO 2004/077895 | 9/2004 |
| WO | WO 2004/105038 | 12/2004 |
| WO | WO 2006/020932 | 2/2006 |
| WO | WO 2006/046996 | 5/2006 |
| WO | WO 2006/050562 | 5/2006 |
| WO | WO 2006/053046 | 5/2006 |
| WO | WO 2006/084106 | 8/2006 |
| WO | WO 2006/044521 | 12/2006 |
| WO | WO 2007/005084 | 1/2007 |
| WO | WO 2007/081828 | 7/2007 |
| WO | WO 2007/095335 A2 | 8/2007 |
| WO | WO 2007/145774 | 4/2008 |
| WO | WO 2008/112250 | 9/2008 |
| WO | WO 2008/113021 | 9/2008 |
| WO | WO 2009/094138 | 10/2009 |
| WO | WO 2010/036351 | 4/2010 |
| WO | WO 2010/091388 | 8/2010 |
| WO | WO 2014/026175 | 2/2014 |
| WO | WO 2015/123406 | 8/2015 |
| WO | WO 2016/069838 | 5/2016 |

OTHER PUBLICATIONS

"Adsorbent Breather Filter (ABF) Product Guidelines & Specifications," Donaldson Company 2003, 1 page.
"Adsorbent Label Filter (ALF) Product Guidelines & Specifications," Donaldson Company 2003, 1 page.
"Adsorbent Pouch Filter (APF) Product Guidelines & Specifications," Donaldson Company 2003, 1 page.
"Adsorbent Recirculation Filter (ARF) Product Guidelines & Specifications," Donaldson Company 2003, 1 page.
File History for Related U.S. Appl. No. 13/831,458 downloaded Sep. 1, 2016 (1230 pages).
File History for Related U.S. Appl. No. 14/537,212 downloaded Sep. 1, 2016 (536 pages).
"Final Office Action," for U.S. Appl. No. 14/420,829 dated Oct. 18, 2016 (12 pages).
"Response to Final Office Action," for U.S. Appl. No. 14/420,829, filed Dec. 6, 2016 (9 pages).
"Non-Final Office Action," for U.S. Appl. No. 14/420,829 dated Jan. 5, 2017 (14 pages).
"Final Office Action," for U.S. Appl. No. 14/420,829 dated Jun. 27, 2017 (15 pages).
"Response to Final Office Action," for U.S. Appl. No. 14/420,829, filed Aug. 25, 2017 (7 pages).
"First Office Action," for Chinese Patent Application No. 201380050143.7 dated July 26, 2016 (12 pages) with English translation.
"Second Office Action," for Chinese Patent Application No. 201380050143.7 dated Mar. 30, 2017 (22 pages) with English translation.
"Third Office Action," for Chinese Patent Application No. 201380050143.7 dated Sep. 5, 2017 (19 pages) with English translation.
"Final Office Action," for Chinese Patent Application No. 201380050143.7 dated Feb. 27, 2018 (10 pages) with English translation.
"First Office Action," for Chinese Patent Application No. 201580008343.5 dated Feb. 23, 2018 (28 pages) with English translation.
"International Preliminary Report on Patentability," For PCT Application No. PCT/US2013/054446 dated Feb. 19, 2015 (13 pages).
"International Preliminary Report on Patentability," for PCT/US2015/015991 dated Aug. 25, 2016 (16 pages).
"International Preliminary Report on Patentability," for PCT Application No. PCT/US2015/057950 dated May 11, 2017 (10 pages).
"International Search Report and Written Opinion," for PCT/US2013/054446 dated Dec. 11, 2013 (17 pages).
"International Search Report and Written Opinion," for PCT/US2015/015591 dated Apr. 28, 2015 (19 pages).
"International Search Report and Written Opinion," for PCT Application No. PCT/US2015/057950 dated Feb. 3, 2016 (14 pages).
"Non-Final Office Action" for U.S. Appl. No. 14/420,829 dated May 3, 2016 (19 pages).
"Search Report," for Singapore Patent Application No. 11201500951X, prepared Sep. 1, 2015 (3 pages).
"Written Opinion" for Singapore Patent Application No. 11201500951X, prepared Dec. 18, 2015 (6 pages).
"Second Written Opinion," for Singapore Patent Application No. 11201500951X prepared Aug. 4, 2016 (6 pages).
"Third Written Opinion," for Singapore Patent Application No. 11201500951X prepared Feb. 8, 2017 (6 pages).
China Light Industry Press, "Beverage production technology Q&A", Sep. 1995. No translation available, translation of Notification for Patent Reexamination dated Sep. 1, 2020, in Chinese Application No. 201580057883.2, filed Oct. 29, 2015, included as explanation of relevance. 24 pages.

\* cited by examiner

RECIRCULATION FILTER FOR AN ENCLOSURE

This application is a continuation application of U.S. patent application Ser. No. 15/118,410, filed Aug. 11, 2016, which is the § 371 U.S. National Stage of PCT International Patent Application No. PCT/US2015/015591, filed Feb. 12, 2015 in the name of DONALDSON COMPANY, INC., a U.S. national corporation, applicant for the designation of all countries and Stanley B. Miller, III, a U.S. Citizen; Allen N. Nicklay, a U.S. Citizen; Christopher J. Fischer, a U.S. Citizen; and Daniel L. Tuma, a U.S. Citizen, inventors only for all designated states, and claims priority to U.S. Provisional Patent Application No. 61/939,683, filed Feb. 13, 2014, the contents of which are herein incorporated by reference in their entireties.

TECHNOLOGICAL FIELD

The present technology is directed to filters for use in electronic enclosures. In particular, the technology is directed to filters for removing contaminants circulating within the interior of an electronic enclosure.

BACKGROUND

Contaminants within an electronic enclosure, such as a hard disk drive enclosure, can reduce the efficiency and longevity of the components within the enclosure. Contaminants can include chemicals and particulates, and can enter the hard drive enclosure from external sources, or be generated within the enclosure during manufacture or use. The contaminants can gradually damage the drive, resulting in deterioration of drive performance and even complete failure of the drive. Consequently, data storage systems such as hard disk drives typically have one or more filters capable of removing or preventing entry of particulate and/or chemical contaminants in the air within the disk drive enclosure. One type of such filter is a recirculation filter, which is generally placed such that it can filter out contaminants from the path of airflow caused by rotation of one or more disks within the disk drive. Although existing recirculation filters can remove many contaminants, a need exists for improved performance at removing certain contaminants, in particular, chemical contaminants.

BRIEF DESCRIPTION OF THE DRAWINGS

The current technology will be more fully explained with reference to the following drawings.

Figure 1:
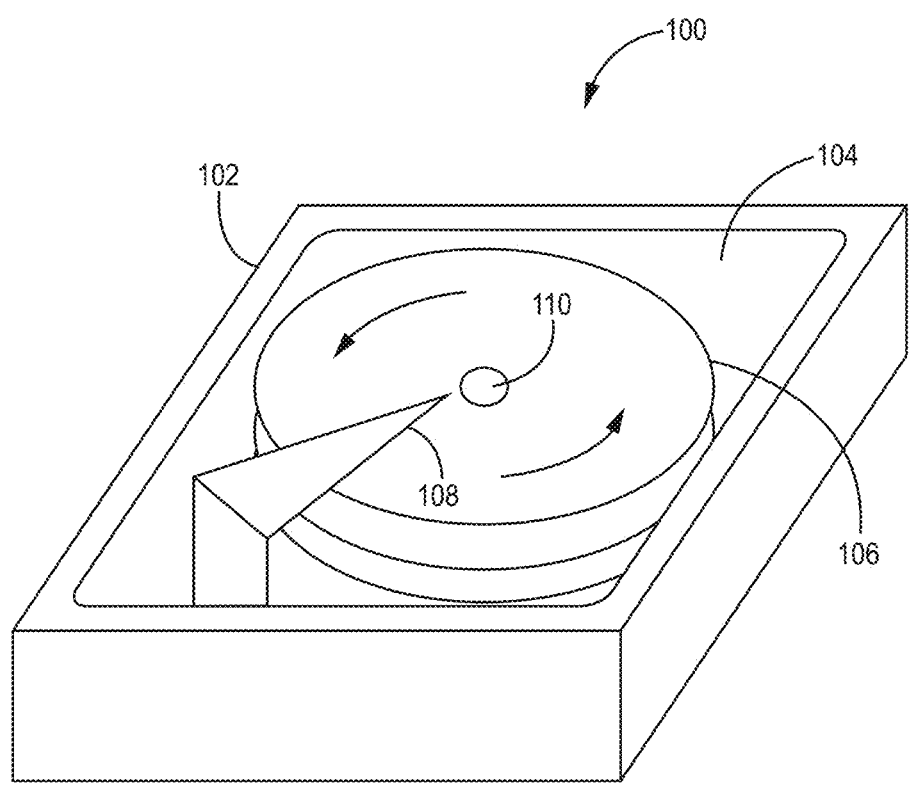
FIG. 1 is a simplified perspective view of a disk drive assembly, showing the top of the disk drive assembly removed.

While principles of the current technology are amenable to various modifications and alternative forms, specifics thereof have been shown by way of example in the drawings and will be described in detail. It should be understood, however, that the intention is not to limit the currently-described technology to the particular embodiments described. On the contrary, the intention is to cover all modifications, equivalents, and alternatives falling within the spirit and scope of the disclosure and claims.

DETAILED DESCRIPTION

Various filtering systems are known that are used to reduce or remove contaminants from disk drive assemblies, as well as other electronic enclosures. In particular, recirculation filters are often used to reduce or remove particulate and/or chemical contaminants that have entered a disk drive enclosure or been generated during use of the disk drive. A typical recirculation filter has a filter element that is positioned in the path of air currents induced by disk rotation such that contaminants present in the air current are subject to filtration.

In an example embodiment, the filter assembly has a filter structure with first sheet of filter media and a second sheet of filter media bonded to each other about their respective perimeter regions, and an adsorbent material disposed between the layers of filter media.

Generally, a support layer such as a permeable scrim material can form at least a portion of the filter structure. A filter media is disposed within the internal recess of the filter assembly, the filter media at least partially covering the support layer. In an example embodiment the filter media will overlay all or most of the support layer. In another example embodiment the support layer is embedded within the filter media. In some embodiments the filter media and the support layer are combined together to form a layer of filter media before production of the filter assembly (such as, for example, by lamination, heat bonding, or light calendaring) and subsequently formed into a media structure that creates at least a portion of the filter assembly.

In some embodiments, the support layer is a permeable scrim material that comprises a woven or non-woven material, such as polypropylene fibers. The support layer can have, for example, a permeability of between about 100 ft./min. at 0.5 inches of water and about 800 ft./min. at 0.5 inches of water in some embodiments. In some embodiments the support layer has a permeability of about 250 ft./min. at 0.5 inches of water and about 600 ft./min. at 0.5 inches of water. In yet other implementations the support layer has a permeability of about 300 ft./min. at 0.5 inches of water and about 500 ft./min at 0.5 inches of water, It will be understood that suitable support layer material can have, for example, a permeability of more than 100 ft./min. at 0.5 inches of water; more than 250 ft./min. at 0.5 inches of water; or more than 300 ft./min. at 0.5 inches of water. Suitable support layer material can have, for example, a permeability of less than about 800 ft./min. at 0.5 inches of water in some embodiments; less than 600 ft./min. at 0.5 inches of water in some embodiments; or less than 500 ft./min. at 0.5 inches of water in some embodiments.

The filter media consistent with the technology disclosed herein can be electrostatic in nature. In a variety of embodiments the filter media has a Figure of Merit greater than about 60. The Figure of Merit can be calculated to evaluate the ability of a filter or filter medium to provide sufficient clarification of a stream in various filtration environments including, relevant to the present disclosure, electronics housings. The Figure of Merit is calculated based upon a fractional efficiency determined for particles having a size of 0.3 μm in an air flow having a velocity of 10.5 ft./min. and a Frazier permeability at 0.5 inches H$_2$O.

The Figure of Merit, discussed more fully hereinafter, is similar to another property called Figure of Merit Prime (FOM'). FOM' is defined as the fractional efficiency of a medium divided by its resistance. The equation describing the Figure of Merit Prime is:

$$FOM' = \frac{\text{fractional efficiency}}{\text{resistance}}$$

The fractional efficiency is the fraction or percentage of particles of a specified size which are removed from air passing through the medium at a specified air flow velocity. Applicants have found it convenient to determine fractional efficiency based upon a particle size of 0.3 μm and an airflow velocity of 10.5 ft./min. It should be understood that the particle size of 0.3 μm actually reflects a distribution of particles of between 0.3 and 0.4 μm.

The resistance is the slope of the pressure drop of the filter as a function of the air flow velocity. For convenience, the units chosen are inches of water for pressure drop and feet per minute for air flow velocity. The units for resistance are then inches MO/ft./min.

Since the resistance for a given filter medium can be difficult to obtain, the Frazier permeability is used as a convenient substitute. The Frazier permeability is the linear air flow velocity through a medium at a half inch of water pressure (0.5" H$_2$O). The Figure of Merit (FOM) is:

FOM=fractional efficiency×2×Frazier permeability

The Frazier permeability is calculated from measurements of pressure drop (ΔP) in units of inches of water (" H$_2$O) at a specified airflow velocity or volumetric flow rate. The Frazier permeability is estimated by multiplying 0.5 times the airflow velocity and dividing by the pressure drop. It should be appreciated that the volumetric flow rate can be converted to an air flow velocity by dividing by the area of the medium, and that the air flow velocity should be converted to feet per minute (ft./min.).

For predicting the FOM of a combination of layers that have not yet been assembled as a filter media, the fractional efficiency can be calculated as the total penetration of the individual layers. The total Frazier permeability of the combination of layers is the reciprocal of the sum of the reciprocals of the Frazier permeabilities of each individual layer. The total FOM is then the total penetration multiplied by the total Frazier permeability multiplied by 2.

For recirculation filters, it can be desirable to provide a FOM that is as high as possible. A high FOM corresponds with high permeability, which is important for a filter placed in a stream of circulating air. Recirculation filters consistent with the technology disclosed herein have a FOM value of at least about 60, and in some embodiments at least about 150. Generally, the FOM can be between about 50 and about 250, or even between about 150 and about 200.

The filter media can contain various fibers, and is optionally a mixed fiber media comprising polypropylene and acrylic fibers. The filter media has, for example, a permeability of between about 250 ft./min. at 0.5 inches of water and about 750 ft./min. at 0.5 inches of water. The filter media can have a filtering efficiency of about 20% to about 99.99% for 0.1 to 0.3 micron particulate contaminants in some embodiments. Suitable filter media can, for example, have a filtering efficiency of greater than 20% for 0.1 to 0.3 micron particulate contaminants; greater than 40% for 0.1 to 0.3 micron particulate contaminants; or greater than 60% for 0.1 to 0.3 micron particulate contaminants. The filter media can have in some example implementations a filtering efficiency of less than 99.99% for 0.1 to 0.3 micron particulate contaminants; less than 80% for 0.1 to 0.3 micron particulate contaminants; or less than 60% for 0.1 to 0.3 micron particulate contaminants.

In a variety of embodiments, the filtration media consistent with the technology closed herein has electrostatic fibers. The term "electrostatic fibers," as used herein, refers to fibers that contain an electric charge. One advantage of including electrostatic fibers in the filter assembly 200 is that the filter is not only able to mechanically trap contaminants, but is also able to exert an electrostatic force on contaminants that contain electric charges, thereby increasing the amount of contaminants that are removed from the airstream. The electrostatic media can be triboelectric media, electret media, or any other media that can be charged, or that depends on charging as the main mechanism for particle removal. In example embodiments, the electrostatic media has triboelectric fibers. Triboelectric fibers are known and can be formed, for example, using a mixture of (1) polyolefin fibers such as polyethylene, polypropylene or ethylene and propylene copolymers, with (2) fibers of another polymer, for example, fibers containing hydrocarbon functions substituted by halogen atoms, such as chlorine or polyacrylonitrile fibers. In general, the polyolefin fibers and the other polymer fibers are included in the electrostatic media at a weight ratio between about 60:40 or about 20:80 or about 30:70.

Now, in reference to the drawings, FIG. 1 is a simplified perspective representation of a disk drive 100. The disk drive 100 has a housing body 102 that defines an enclosure 104. In an example embodiment, at least one disk 106 is rotatably mounted within the enclosure 104. The rotation of the disk is shown by arrows (although opposite rotation is alternatively possible), where the rotation of the disk induces airflow within the enclosure 104. Other disk drive components, such as a read-write head and wiring can be incorporated into an armature 108.

Figure 2:
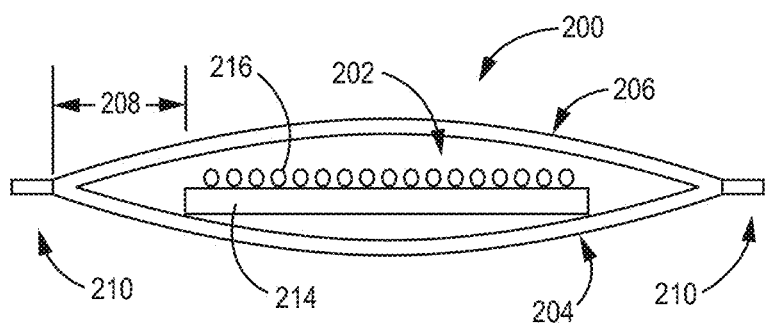
FIG. 2 is a cross sectional schematic view of a filter assembly from a first side.
Figure 3:
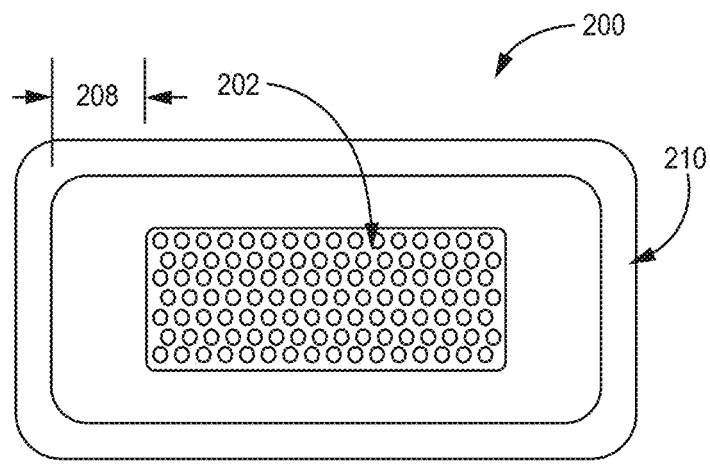
FIG. 3 is a cross sectional schematic view of the filter assembly consistent with the embodiment depicted in FIG. 2, viewed from a second side.

FIGS. 2 and 3 are cross sectional views of a known filter assembly 200 that is disclosed herein for comparison purposes. A carbon element 202, which can be referred to as an adsorbent element, is disposed between a first sheet 206 having a first support layer and a first layer of electrostatic filter material, and a second sheet 204 having a second support layer and second layer of electrostatic filter material, and the carbon element 202 fills a portion of a cavity defined by the first sheet and second sheet 206, 204. The carbon element 202 is generally configured to help filter the air passing through the filter assembly 200 and has a scrim layer 214 with a plurality of carbon beads 216 adhered thereto.

A perimeter region of the first sheet 206 is welded with a perimeter region of the second sheet 204 around the carbon element 202, resulting in a clearance 208. The clearance 208 describes a portion of the filter between the weld 210 and the carbon element 202. In the design shown in FIGS. 2 and 3 the carbon element is generally sized smaller than the media area due to the clearance 208 required for manufacturing processes. The clearance 208 can ensure that during the welding process a portion of the carbon element 202 does not get welded between the layers. If a portion of the carbon element 202 becomes welded between the layers, the filter could be rejected for having a defect. If the filter is not rejected and is used in an electronics enclosure, a portion of the carbon element 202 could become particle contamination for the enclosure. The reduction in the carbon element 202 area can become even greater as the outside dimensions of the filter get smaller. As the filter gets smaller it can become more difficult to get the relatively flat media to flex over the carbon and result in the need to use a thinner carbon element 202.

Figure 4:
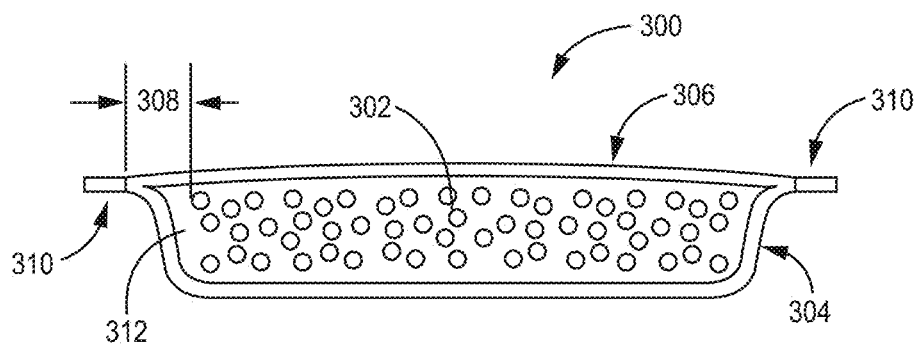
FIG. 4 is a cross sectional schematic first-side view of a filter assembly as described herein, viewed from a first side.
Figure 5:
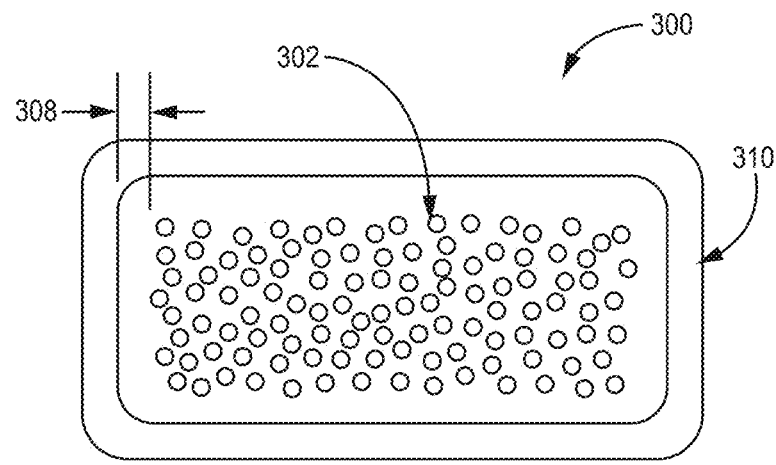
FIG. 5 is a cross sectional schematic second-side view of a filter assembly consistent with the embodiment depicted in FIG. 4, viewed from a second side.

FIGS. 4 and 5 are cross sectional views of a filter assembly 300 consistent with the technology disclosed herein having at least a first sheet 304, a second sheet 306, and an adsorbent 302 disposed in a cavity 312 defined between the first sheet 304 and the second sheet 306. The first sheet 304 generally has a first perimeter region that can be bonded to a perimeter region of the second sheet 306 to form a rim region 310. In a variety of embodiments, the rim region 310 is a weld area from heat welding or ultrasonic welding, as examples.

The filter assembly 300 is generally configured to filter particles and chemical contaminants from air. In a variety of embodiments the filter assembly 300 is configured to be positioned in an electronics enclosure to filter the air therein. In some embodiments the filter assembly 300 is configured to be positioned in a disk drive to filter the air within the disk drive. Other uses for the filter assembly will be appreciated.

In a variety of embodiments, the first sheet 304 and the second sheet 306 are generally layers of filter media that are consistent with the types of filter media already described herein. The first sheet 304 and the second sheet 306 can be configured to filter particulates from the air. In a variety of embodiments, the first sheet 304 can generally be constructed of a first layer of filter material having a first support layer coupled thereto. Similarly, the second sheet 306 can generally be constructed of a second layer of filter material having a second support layer coupled thereto. The first support layer and the second support layer can be consistent with support layers already described herein, and in at least one embodiment, the first support layer and the second support layer are constructed of the same material. It will generally be understood that any number of layers can be coupled to form the first sheet 304 and the second sheet 306 so long as the desired filter parameters are achieved based on the context of the filter, such as permeability, efficiency, FOM, pressure drop, etc.

In some embodiments, the first sheet 304, the second sheet 306, or both sheets 304, 306 are at least partially constructed of electrostatic fibers, previously discussed. In at least one embodiment, the second sheet 306 is the same material as the first sheet 304. In another embodiment, the first sheet 304 and the second sheet 306 are different materials. For example, in one embodiment, the second sheet 306 can be a screen layer that is welded, fused or otherwise bonded to the first sheet 304. In some such embodiments, the first sheet 304 can have an electrostatic filter media layer and a support layer that are welded together, and the screen layer can be welded to the layer of filter media in the rim region 310. The screen layer can generally allow air to pass through the screen layer and into the cavity 312 of the filter assembly 300. The screen layer can additionally provide support, such as to aid the filter assembly 300 in keeping a desired configuration.

In the current embodiment, the first sheet 304 at least partially defines the shape of the cavity 312. The cavity 312 can be substantially self-supporting in at least one example embodiment, but is not substantially self-supporting in another example embodiment. The term "substantially self-supporting" is used to mean that the first sheet 304 has the ability to retain the existence of the cavity 312 against atmospheric gravity. In the current embodiment, the second sheet 306 is substantially planar, meaning that the structure of the second sheet 306 itself does not define a cavity; rather, the structure of the second sheet 306 encloses the cavity defined by the first sheet of filter media 304.

The adsorbent 302 can be disposed between the first sheet 304 and the second sheet 306 within the cavity 312. The adsorbent 302 is generally configured to adsorb chemical contaminants from the air within the environment of the filter assembly 300. The adsorbent material can be a physisorbent or chemisorbent material, such as, for example, a desiccant (i.e., a material that adsorbs or absorbs water or water vapor) or a material that adsorbs or absorbs volatile organic compounds, acid gas, or both. Suitable adsorbent materials include, for example, activated carbon, activated alumina, molecular sieves, silica gels, potassium permanganate, calcium carbonate, potassium carbonate, sodium carbonate, calcium sulfate, or mixtures thereof. The adsorbent 302 is generally a plurality of adsorbent beads. In a variety of embodiments, the adsorbent 302 is a plurality of activated carbon beads. The adsorbent beads can range in size from about 0.2 mm to about 1.1 mm, 0.4 mm to about 1.0 mm, and about 0.3 mm to about 0.9 mm. In one embodiment the adsorbent beads will have an average size of about 0.3 mm to about 0.8 mm, or about 0.6 mm.

In some embodiments a substantial portion of the plurality of adsorbent beads are unbonded, meaning that a substantial portion of the adsorbent beads are unbonded to each other and are unbonded to any other element in the filter assembly. In at least one embodiment, each of the plurality of adsorbent beads are completely unbonded. By a "substantial portion" it is meant that at least 70%, 80%, 90%, 95% or even 98% of the adsorbent beads are unbonded. Unbonded beads have the relative advantages of increasing the available surface area for adsorption, increasing the permeability of the filter itself, and can having low dusting, for example. A clearance 308 defined by the filter assembly 300 as shown in FIGS. 4 and 5 can be reduced and more adsorbent 302 can be disposed within the cavity as compared to the filter element depicted in FIGS. 2 and 3. In an embodiment, the filter assembly 300 can be about 8.5 mm×20 mm and can be about 4 mm thick. In embodiments having carbon beads as the adsorbent 302, the mass of the carbon beads can be at least 35 mg and generally no more than about 55 mg, such as about 45 mg. In an embodiment, the filter assembly 300 can be about 4 mm×15.5 mm and comprise carbon beads with a mass of at least 20 mg and generally no more than about 45 mg, such as about 33 mg.

The filter constructions consistent with the technology disclosed herein allow for a relative increase in the amount of adsorbent material that can be contained in the filter (such as activated carbon) while preserving a relatively compact size, and while improving filter performance. In particular, in certain embodiments, the filters described herein can result in increases in activated carbon quantity while substantially preserving airflow through the filter, thereby allowing for lower contaminant levels within an enclosure and maintenance of those lower concentration levels for an extended time period.

Figure 6:
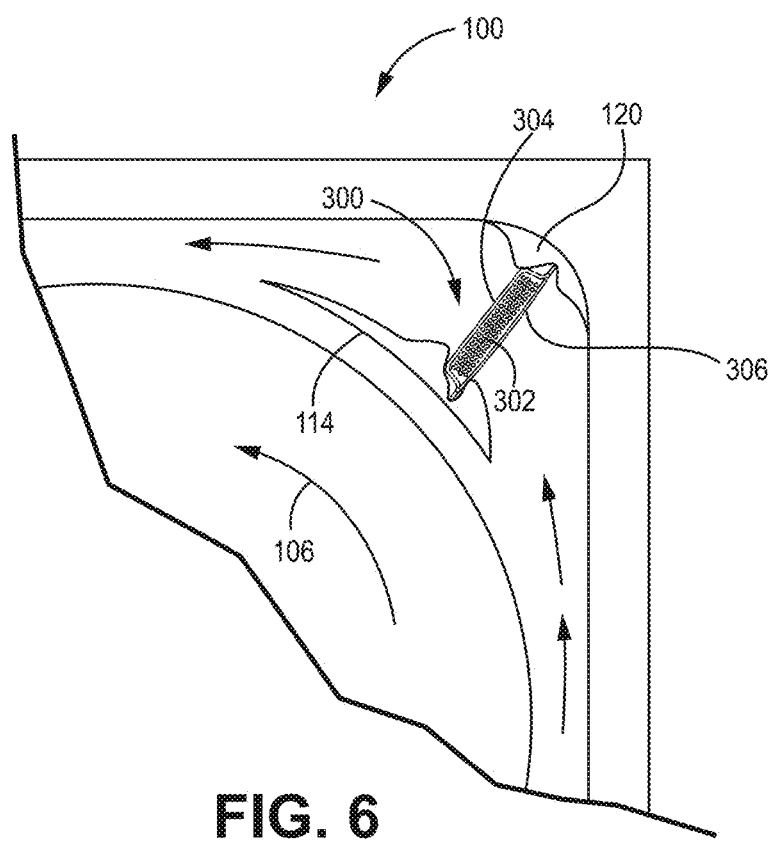
FIG. 6 is a schematic of a partial top plan view of a disk drive assembly containing a filter assembly constructed and arranged in accordance with an example implementation of the currently disclosed technology.

FIG. 6 depicts an example implementation of a filter assembly 300 consistent with the technology disclosed herein. The filter assembly 300 is generally consistent with the embodiment depicted in FIGS. 4-5 and is installed within a housing defining an electronic enclosure 100 (only a corner of the enclosure 100 is depicted). The filter assembly 300 has a first sheet 304, a second sheet 306, and adsorbent 302 disposed between the first sheet 304 and the second sheet 306. The filter assembly is oriented so that the surface area of the second sheet 306 is facing into the air stream generated by a rotating disk 106 (depicted directionally by arrows). The electronic enclosure 100 has a filter mount 120 that is configured to receive the filter assembly 300. In the embodiment shown, a baffle 114 is present to aid in the direction of air into the second sheet 306 of the filter assembly 300, and the baffle 114 at least partially defines the filter mount 120. The filter assembly 300 can be placed within the electronic enclosure such that the baffle 114 directs air into and through the second sheet 306. In certain implementations the baffle 114, along with any mounting elements, or other portions of the housing, form a channel that directs air into the second sheet 306. In other implementations the filter assembly 300 is configured to be positioned in a flowing air stream within an electronics enclosure that lacks a single defined channel directing airflow through the filter assembly 300, or an open-sided channel can be formed within the enclosure that partially directs air through the filter assembly 300.

Test Results

In an example filter construction consistent with the comparative example shown in FIGS. 2-3 and described herein, a first recirculation filter was constructed having a first sheet and a second sheet that were bonded about their respective perimeters. A carbon element, having a scrim layer with carbon beads coupled thereto, was disposed between the first sheet and second sheet. Each of the first sheet and second sheet were constructed of a layer of electrostatic filter media and a polypropylene scrim layer. The first recirculation filter had a width of 15.4 mm, a height of 8.9 mm, and a thickness of 2.8 mm. This first recirculation filter had a welded perimeter of about 1 mm. This first recirculation filter had an active filtering area of 13.4 mm×6.9 mm, or approximately 92 mm², where the active filtering area was measured based on the flow face area of the filter that was available for filtration within the bonded perimeter. The flow face of the recirculation filter is a filter surface that is configured to directly receive airflow during filtration. The carbon element had a width of 8.1 mm, a height 3.6 mm, and an adsorbent face area of approximately 29 mm², where the adsorbent face area is the measurement of the area of the filter containing adsorbent (e.g. carbon beads), measured from the flow face of the recirculation filter. As such, for the first example recirculation filter, the adsorbent face area was equivalent to the area of the carbon element itself. The area of the carbon element was approximately 35% of the active filtering area of the recirculation filter. The adsorbent element had a carbon mass of 8 mg.

A second example recirculation filter was made in accordance with the embodiment depicted in FIGS. 4-5. The second recirculation filter had a first sheet and the second sheet that were joined about their respective perimeters. Each of the first sheet and second sheet were constructed of a layer of electrostatic filter media and a polypropylene scrim layer. The first sheet defined a cavity recessed from its perimeter, and the cavity was defined between the first sheet and the second sheet. The second recirculation filter had a thickness of 4.8 mm. The cavity was about 10.9 mm wide×4.4 mm tall×3 mm deep. The cavity had a volume of about 120 mm³. The cavity was filled with 45 mg of unbonded activated carbon beads. The adsorbent face area of the carbon beads in the second recirculation filter was about 48 mm².

As described above, the adsorbent face area is used herein as a measurement of the area of the filter containing adsorbent measured from a flow face of the recirculation filter. The carbon face area of the second example recirculation filter was measured using a VHX-1000 digital microscope from Keyence Corporation based in Itasca, Ill., having a Keyence VH-Z20R lens. A 60 W soft white incandescent light bulb was used as a backlight.

In particular, the microscope lens was positioned 90 degrees to the microscope base, facing a stage. The bulb was positioned 4.5 inches away from the microscope lens and pointed directly into the microscope lens. The filter was secured along one perimeter edge to the stage to stand vertically between the microscope lens and the bulb, one inch from the microscope. One face of the filter was positioned towards the microscope lens. The microscope was set to 20× magnification. No lighting options from the microscope were used. The incandescent bulb was illuminated and the brightness adjustment dial on the VHX-1000 console was set to allow the appropriate amount of light into the lens such that the perimeter of the filter became indistinguishable from the backlight, which amounted to approximately 75% of the maximum brightness setting. A free-form shape tool in the software of the VHX-1000 was used to calculate the adsorbent face area. A free-form shape was used to outline the perimeter of the carbon area, and the individual measurement option within the software was selected from the measurement menu to automatically calculate the area within the outlined perimeter.

Table 1, below, compares aspects of the first recirculation filter with the second recirculation filter example, disclosed above:

TABLE 1

| | Adsorbent Amount (mg) | Adsorbent Face Area (mm²) | Carbon Density in Adsorbent Face Area (g/m²) | Active Filter Face Area (mm²) | Carbon Density in Active Face Area (g/m²) | Lowest Concentration CCU (ppm) | $T_{90}$ PCU (sec) |
|---|---|---|---|---|---|---|---|
| First Filter | 8 | 29 | 280 | 92 | 90 | 23.33 | 12.50 |
| Second Filter | 45 | 48 | 940 | 92 | 490 | 6.58 | 12.36 |

The airflow restriction through the second recirculation filter is generally similar or less than the airflow restriction through the first recirculation filter. On one hand, the added mass of carbon in the second recirculation filter generally slightly increased the airflow restriction compared to the first recirculation filter; however, on the other hand, the increase of filtering area in the second recirculation filter can contribute to a reduction in the airflow restriction. Further, the elimination of the scrim adhered to the carbon beads (used in the first recirculation filter) can contribute to a relative decrease in airflow restriction in the second recirculation filter. The net airflow restriction through the second recirculation filter can be less than or approximately equal to the airflow restriction through first recirculation filter. The airflow restrictions through recirculation filters can be closely related to particle clean-up (PCU), therefore, in some implementations there is little to no reduction in particle cleanup for second recirculation filter with the increased amount of carbon, and no increase in airflow restriction.

The two example recirculation filters were subjected to PCU testing conducted to compare the average PCU time $T_{90}$ for each filter. The PCU performance can be calculated by running a particle cleanup test using a continuous particle introduction test method. This method provides a continuous flow of air with a controlled concentration of particles into a disk drive through an injection port and running the disk drive. Air is sampled from the drive through a sample port to get a concentration difference between the unfiltered air particle content and the filtered air particle content. The sample port used to sample the filtered air is slightly upstream of the filter being tested and the injection port is positioned approximately on the opposite side of the spindle of the rotating disk from the sample port. In use, a typical disk drive is sealed off from the outside environment with the exception of a breather port that allows for pressure equalization between the disk drive and the environment. For the currently described PCU test, however, the disk drive breather port is sealed off so that the airflow drawn into the drive is substantially equal to the flow being drawn out of the drive through the sample port by a particle counter.

The PCU test used 0.1µ polystyrene latex spheres (PSL) provided by Thermo Fischer Scientific Inc., based in Minneapolis, Minn., which are suspended in water and then atomized using a TSI 3076 Aerosol Generator from TSI, Inc. based in Shoreview, Minn. The aerosol stream is then dried using a diffusion dryer and then passed through a TSI 3012A Aerosol Neutralizer (also from TSI, Inc.). Since the output from the atomizer is greater than that necessary for the sample flow of the test, a tee pipe is used to exhaust the bulk of the airflow. A small portion of the airflow, however, is drawn into a disk drive through the injection port at flow rate Q. The particle counter used for this test is an Ultra-High Sensitivity Aerosol Spectrometer (UHSAS) manufactured by Droplet Measurement Technologies based in Boulder, Colo.

Since particles inside the disk drive can also be captured by other surfaces besides the filter, the drive is first tested without a filter to get baseline PCU measurements. Then, when testing the filter of-interest, the baseline can be factored in so that the PCU contribution of the filter can be calculated by the following equation:

$$\tau_f = \frac{V}{Q\left(\frac{C_{a(w\_filter)}}{C_{ss(w\_filter)}} - \frac{C_{a(w/o\_filter)}}{C_{ss(w/o\_filter)}}\right)}$$

Where $\tau_f$=Filter cleanup time constant (min),
V=Drive Volume (cm$^3$),
Q=Sample Flow Rate (cm$^3$/min),
$C_{a(w\_filter)}$=Particle concentration into the drive with the filter (particles/cm$^3$),
$C_{ss(w\_filter)}$=Particle concentration steady state from the drive with the filter (particles/cm$^3$),
$C_{a(w/o\_filter)}$=Particle concentration into the drive without filter (particles/cm$^3$), and
$C_{ss(w/o\_filter)}$=Particle concentration steady state from the drive without filter (particles/cm$^3$).

The above formula provides the filter cleanup time constant $\tau_f$, which estimates the time to reach a 63.2% reduction from the initial particle concentration in the air. However, it has become standard practice to report the time to reach 90% reduction in particle concentration, which is equal to 2.3 time constants. It is also standard practice to report the time in seconds, so the $T_{90}$ cleanup time is calculated by the following equation:

$$T_{90} = \tau_f \times 60 \times 2.3$$

The $T_{90}$ results in Table 1 were tested using a 2.5" drive with a volume of 22 cm$^3$. The disk drive operates three stacked disks at 10,000 RPM. The flow rate Q was 30 cm$^3$/min and the target input concentration ($C_{a(w\_filter)}$ and $C_{a(w/o\_filter)}$) was 83 particles/cm$^3$. As reflected in Table 1, the second example recirculation filter had slightly improved filter cleanup time $T_{90}$ than the first example recirculation filter by about 1%. Various embodiments of filters consistent with the technology disclosed herein will have a PCU time $T_{90}$ that is no more than 15% greater than a similarly-sized filter element having an adsorbent element consistent with that of the first example recirculation filter, where the term "similarly-sized" is defined as a filter element having an equivalently-sized active filter area.

The two example recirculation filters were also subjected to a chemical clean-up test (CCU). In each CCU test, the tested recirculation filter was positioned in the same type of disk drive as that used in the PCU testing, described above. A flow of 30 cc/min of nitrogen with 140 ppm of trimethyl pentane (TMP) was injected into the drive through an injection port in the cover of the disk drive. Air samples were drawn from the drive through a 3 mm sampling port in the drive cover that was about 5 mm upstream of the recirculation filter and on the outer diameter of the disk. "Upstream" of the recirculation filter is considered to be opposite of the direction of disk rotation (since spinning the disk is the main driver of airflow within the drive). The injection port was positioned oppositely to the sampling port with respect to the disk drive housing.

A TMP mixed standard at 525 PPM is used that consists of TMP mixed with nitrogen in a high pressure gas tank and is available through specialty gas suppliers like Praxair. The TMP standard is run through a pressure regulator and then run into a Mass Flow Controller (MFC) by Sierra Instruments based in Monterey, Calif. to regulate the mass flow to the equivalent of 8 cc/min at standard conditions of 22.1 Celsius and 1 Atm. A second TMP free flow of nitrogen is run through a regulator and MFC to provide a mass flow equivalent to 22 cc/min at standard conditions and combined with the first flow to give a diluted flow of 30 cc/min at 140 PPM.

The TMP/nitrogen flow is first run through a switching valve to a Gas Chromatograph (GC) with the column removed, which is equipped with a Flame Ionization Detector (FID) supplied by Shimadzu Corporation based in Kyoto, Japan. The voltage output from the FID is recorded at the 140 PPM input concentration and this is used to generate a linear correlation of TMP concentration to voltage. The switching valve then directs the TMP/nitrogen flow into the injection port and the output flow from the sampling port is directed to the GC/FID. Preceding data collection, the TMP/nitrogen is run through the drive for 10 minutes before running the disk drive to allow for the gas flow to stabilize and to purge the drive and hose lines. The disk drive is then turned on to spin up the disks and the TMP concentration is measured at particular time intervals once the disks are spinning at full speed.

Figure 7:
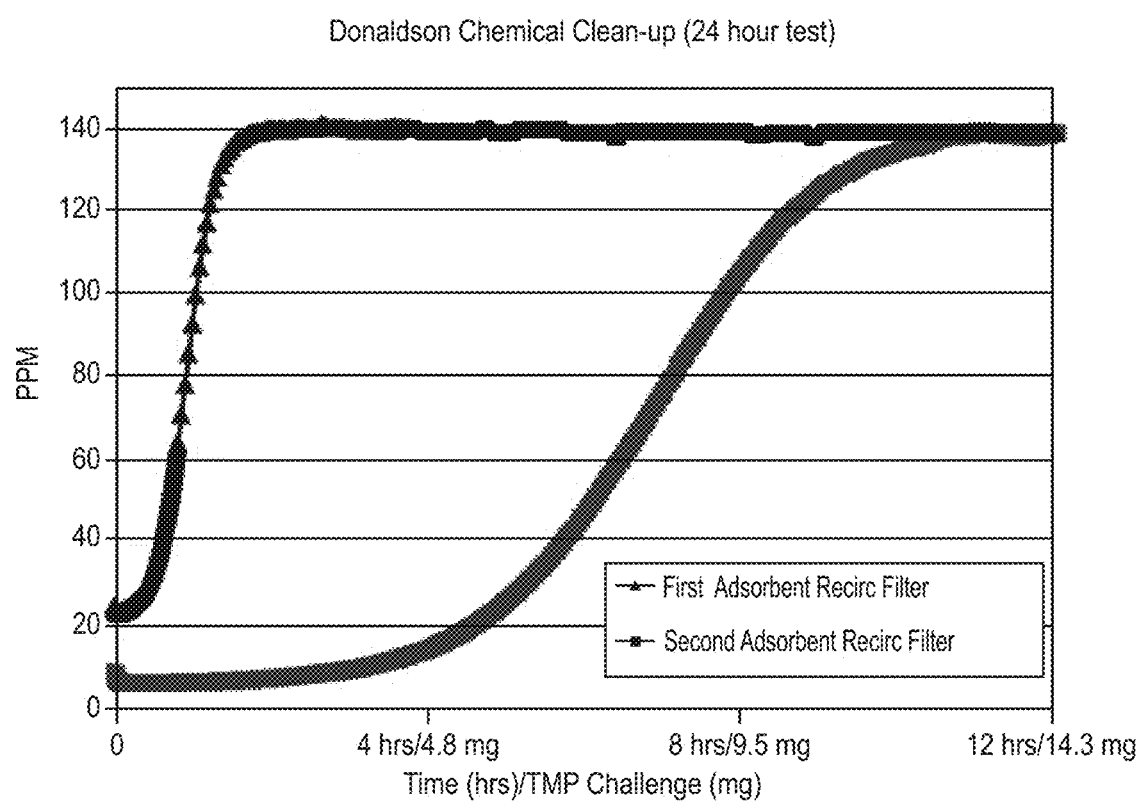
FIG. 7 is a graph showing a performance of a filter concept.

The CCU results of the two example filters tested are shown in FIG. 7, where the PPM concentration of TMP in the drive is shown over time. FIG. 7 also depicts the relationship between the concentration of TMP in the drive with the amount of the TMP challenge (mg), where "TMP challenge" refers to the amount of TMP that is sent into the disk drive. Additionally, the lowest TMP concentration was measured during each CCU test and is listed in Table 1. The lower the TMP concentration in the drive generally indicates the filter is more effective at removing the TMP. It can be desirable to have the TMP concentration stay relatively low, which can be an indication that the filter has a larger capacity for adsorbing contaminates. The CCU performance results for the two example recirculation filters shown in FIG. 7 demonstrate the CCU effectiveness of the added carbon mass and increased carbon cross-sectional area as compared to the first recirculation filter.

Some filters consistent with the technology disclosed herein have a relatively increased density of adsorbent over the adsorbent face area compared to previous technologies. For example, in some embodiments recirculation filters consistent with the technology disclosed herein have an adsorbent density of greater than 600 $g/m^2$ over the adsorbent face area. In some other embodiments, recirculation filters consistent with the technology disclosed herein have an adsorbent density of greater than 650 $g/m^2$ or even greater than 700 $g/m^2$ over the adsorbent face area. In addition, some filters consistent with the technology disclosed herein have a relatively increased density of adsorbent over the active filter face area compared to previous technologies. For example, in some embodiments recirculation filters consistent with the technology disclosed herein have an adsorbent density of greater than 250 $g/m^2$ over the active filter face area. In some other embodiments, recirculation filters consistent with the technology disclosed herein have an adsorbent density of greater than 300 $g/m^2$, 350 $g/m^2$, 400 $g/m^2$, or even greater than 450 $g/m^2$ over the active filter face area. For purposes of calculating the adsorbent density over the carbon face area or active filter area, the mass of scrims, binders, adhesives, and other substances are excluded from the mass of the adsorbent. As described above, in various embodiments the adsorbent is a plurality of activated carbon beads.

FIGS. 8A-8F are schematic depictions showing a method of making a filter assembly. The method can comprise the use of a first mating structure 1504 (shown in FIG. 8A). The first mating structure 1504 defines a perimeter 1505 and a cavity 1506 recessed from the perimeter 1505. The cavity 1506 can be configured to the desired shape of a finished filter, or can be configured to the desired shape of the filter media during manufacturing only, which will be described in more detail, herein.

A first sheet of filter media 1502 can be placed between the first mating structure 1504 and a second mating structure 1507 (shown in FIG. 8B), where the second mating structure 1507 defines a protrusion 1508 configured for mating engagement with the cavity 1506. Additional support layers and/or filter media layers can be coupled to the first sheet of filter media 1502, in some embodiments. In the current embodiment, the second mating structure defines a secondary surface 1509 that is configured for mating engagement with the perimeter 1505 of the first mating structure 1504. Those having skill in the art will appreciate that the term "mating engagement" can encompass configurations where there is a clearance between the corresponding mating structures.

The second mating structure 1507 can be translated, such that it is at least partially disposed within the cavity 1506 and the first sheet of filter media 1502 is compressed between the first mating structure 1504 and the second mating structure 1507. Upon compression between the first mating structure 1504 and the second mating structure 1507, the filter media 1502 will generally define and retain, under atmospheric gravitational forces and absent opposing external forces, a cavity structure 1510 and a rim region 1511 about the perimeter of the cavity structure 1510 similar to the first and second mating structures 1504, 1507 (shown in FIG. 8C). In some embodiments, either the perimeter 1505 of the first mating structure 1504, the secondary surface 1509 of the second mating structure 1507, or both, can be configured to melt material in the rim region 1511 of the first sheet of filter media 1502. The rim region 1511 can then be cooled to harden the melted material to increase its rigidity. In one particular embodiment, the secondary surface 1509 of the second mating structure 1507 is coupled to an ultrasonic welder that is used to melt the rim region 1511. Other types of welders are also contemplated, as will be appreciated.

Figure 8A:
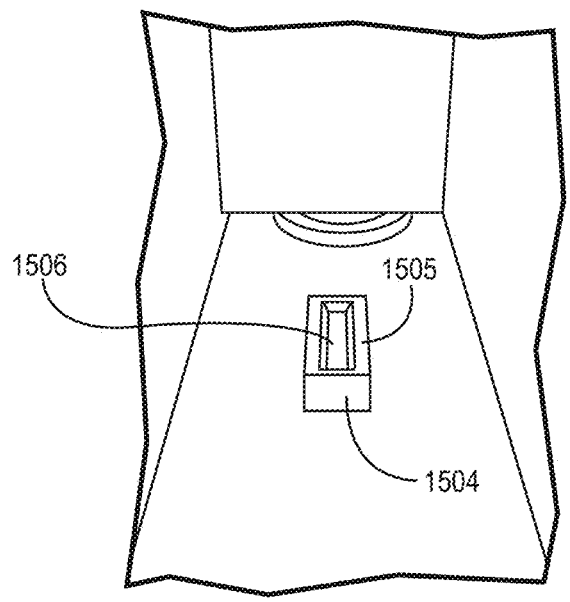
FIGS. 8A-8F are schematic depictions showing a method of making a filter assembly as described herein.
Figure 8B:
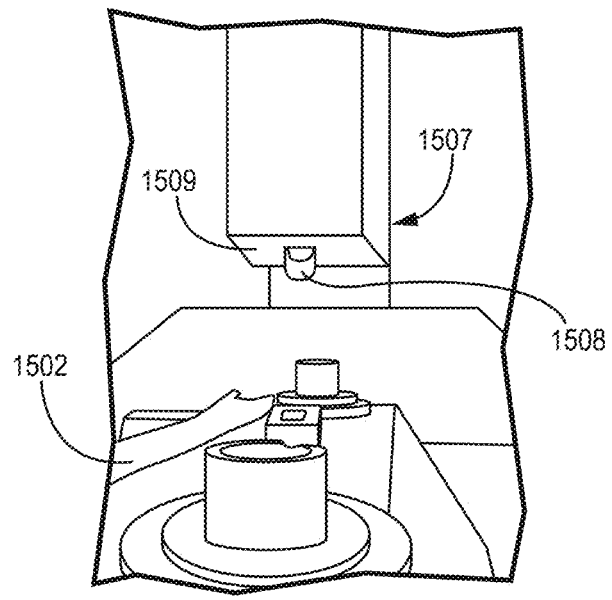
Figure 8C:
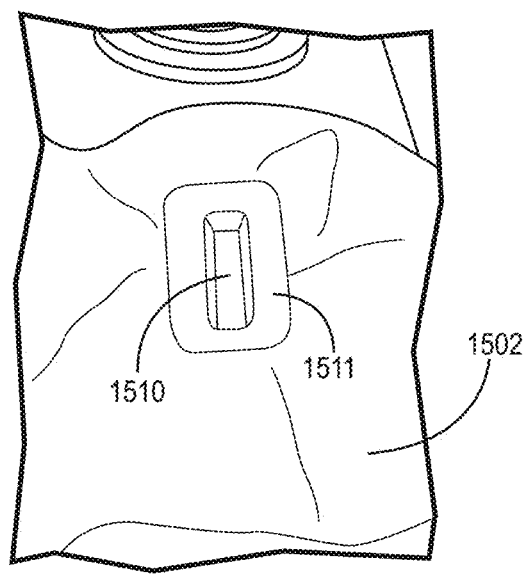
Figure 8D:
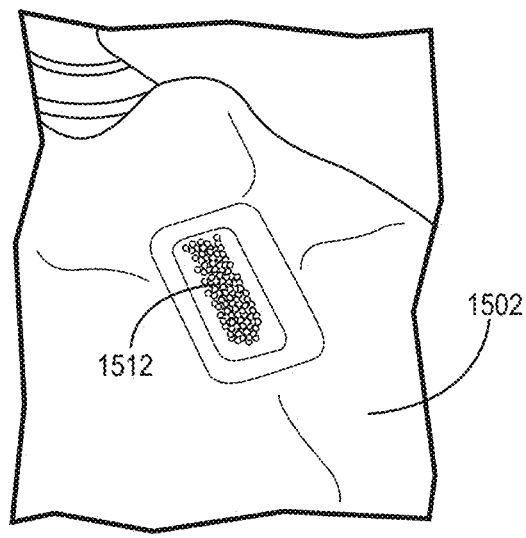

With the second mating structure 1507 removed from the cavity 1506, an adsorbent 1512 can be disposed within the cavity structure 1510 (shown in FIG. 8D). In a variety of embodiments, the adsorbent 1512 is a plurality of adsorbent beads. In one particular embodiment, the adsorbent 1512 is a plurality of activated carbon beads. In an embodiment the adsorbent occupies at least 50% of the cavity. In alternative embodiments, the adsorbent can occupy at least 50%, 60%, 70%, 75%, 80%, 85%, 90%, 95%, or 99% of the cavity structure 1510.

Figure 8E:
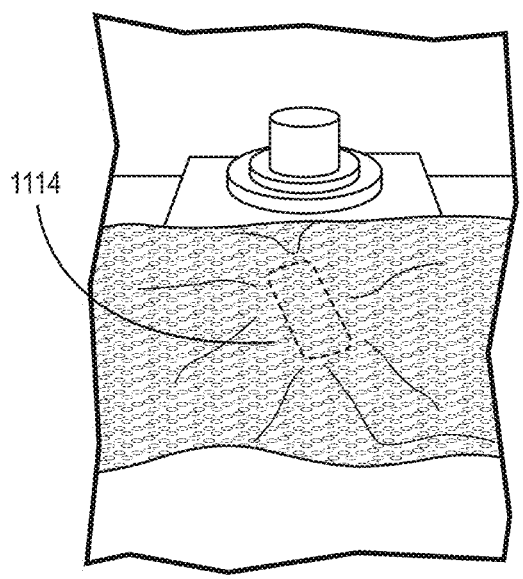
Figure 8F:
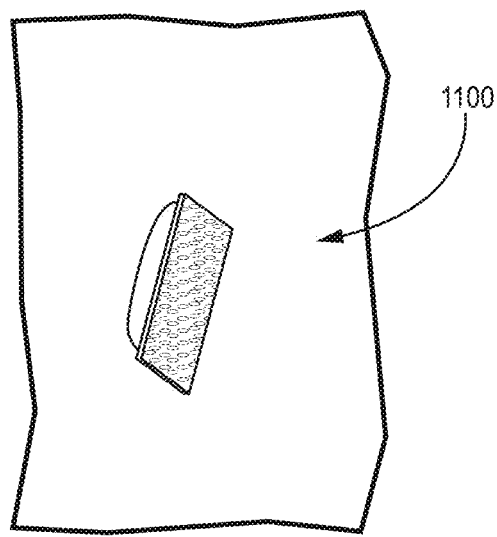

The eventual perimeter region of a second sheet of filter media 1114 is coupled to the rim region 1511 of the first sheet of filter media 1502 to contain the adsorbent beads 1512, between the first sheet of filter media 1502 and second sheet of filter media 1114 (FIG. 8E). In one embodiment the second sheet of filter media 1114 is a screen layer that is disposed across one side of the cavity. In some other embodiments, the second sheet of filter media 1114 is the same material or combination of materials as the first sheet of filter media 1502. The second sheet of filter media 1114 can be welded to the rim region 1511 of the first sheet of filter media 1502. Excess material can be trimmed away from the filter, resulting in the filter 1100 (shown in FIG. 8F).

In some embodiments it can be desirable to bond a portion of the perimeter region of the first sheet of filter media with a portion of the perimeter region of the second sheet of filter media and insert substantially unbonded adsorbent beads in the cavity defined among the first sheet of filter media, the second sheet of filter media, and the bonded portion of the perimeter regions of the first sheet and second sheet. Subsequent to insertion of the adsorbent beads, the remaining unbonded perimeter regions of each of the first sheet of filter media and the second sheet of filter media can be bonded to form a cohesive rim region about the filter.

In one alternate embodiment, the first sheet of filter media and the second sheet of filter media can be defined by a single sheet of filter media, and the method of forming a filter element can have a step of folding the second sheet of filter media relative to the first sheet of filter media to define a fold along one edge of the perimeter region of the resulting filter element. In such a method the unbonded portions of the perimeter regions of the first and second sheets of filter media can be bonded as described herein to form a rim region that extends around at least a portion of the perimeter of the resulting filter element. In some other embodiments it can be desirable to melt material of the first and/or second sheets of filter media together along the fold to increase rigidity. In such embodiments the rim region can extend about the entire perimeter of the resulting filter element. Other embodiments are also contemplated.

The above specification provides a complete description of the manufacture and use of the currently-described technology. Since many embodiments can be made without departing from the spirit and scope of the currently described technology, such technology resides in the claims hereinafter appended.

The invention claimed is:

1. A method of making a filter assembly comprising:
placing a first sheet of filter media having a first perimeter region over a die defining a perimeter and a cavity recessed from the perimeter;
disposing a plurality of adsorbent beads on the first sheet of filter media; and
bonding a second perimeter region of a second sheet of filter media to the first perimeter region of the first sheet of filter media to contain the plurality of adsorbent beads between the first sheet of filter media and the second sheet of filter media, the plurality of adsorbent beads defining an adsorbent face area having an adsorbent density of greater than 600 g/m$^2$.

2. The method of claim 1, wherein a substantial portion of the plurality of adsorbent beads are unbonded.

3. The method of claim 1, wherein bonding the second sheet of filter media to the first sheet of filter media comprises melting the first sheet of filter media and the second sheet of filter media together in the rim region surrounding the adsorbent beads.

4. The method of claim 1, wherein the bonding comprises melting the second sheet of filter media to the first sheet of filter media in the rim region.

5. The method of claim 1, wherein the plurality of adsorbent beads comprises activated carbon beads.

6. The method of claim 1, wherein the first sheet of filter media has a permeability of between about 250 ft./min. at 0.5 inches of water and about 750 ft./min. at 0.5 inches of water.

7. The method of claim 1, wherein the first sheet of filter media and the second sheet of filter media are different materials.

8. The method of claim 1, wherein the first sheet of filter media and the second sheet of filter media are the same materials.

9. A filter assembly comprising:
a first sheet of filter media having a first perimeter region;
a second sheet of filter media having a second perimeter region, wherein the first perimeter region and the second perimeter region are bonded in a rim region; and
a plurality of adsorbent beads disposed between the first sheet of filter media and the second sheet of filter media, the plurality of adsorbent beads defining an adsorbent face area having an adsorbent density of greater than 600 g/m$^2$.

10. The filter assembly of claim 9, further comprising a first support layer coupled to the first sheet of filter media, wherein the first support layer has a permeability of between about 100 ft./min. at 0.5 inches of water and about 800 ft./min. at 0.5 inches of water.

11. The filter assembly of claim 9, wherein the first sheet of filter media defines a substantially self-supporting cavity.

12. The filter assembly of claim 9, wherein the second sheet of filter media is substantially planar.

13. The filter assembly of claim 9, wherein the second sheet of filter media comprises a screen.

14. The filter assembly of claim 9, wherein the plurality of adsorbent beads comprises activated carbon beads.

15. The filter assembly of claim 9, wherein the second sheet of filter media is the same material as the first sheet of filter media.

16. The filter assembly of claim 9, wherein the rim region defines a weld area.

17. The filter assembly of claim 9, wherein at least 90% of the plurality of adsorbent beads are unbonded.

18. The filter assembly of claim 9, wherein the first sheet of filter media has a permeability of between about 250 ft./min. at 0.5 inches of water and about 750 ft./min. at 0.5 inches of water.

19. The filter assembly of claim 9, wherein the first sheet of filter media has a figure of merit greater than about 60, wherein the figure of merit is calculated based upon a fractional efficiency determined for particles having a size of 0.3 µm in an air flow having a velocity of 10.5 ft./min. and a Frazier permeability at 0.5 inches H$_2$O.

* * * * *